US006866781B2

(12) United States Patent
Schindler

(10) Patent No.: US 6,866,781 B2
(45) Date of Patent: Mar. 15, 2005

(54) DIRECT OXYGEN INJECTION GROUNDWATER REMEDIATION METHOD AND SYSTEM

(76) Inventor: A. Russell Schindler, 8666 E. Traverse Hwy., Traverse City, MI (US) 49684

( * ) Notice: Subject to any disclaimer, the term of this patent is extended or adjusted under 35 U.S.C. 154(b) by 171 days.

(21) Appl. No.: 10/079,354

(22) Filed: Feb. 20, 2002

(65) Prior Publication Data

US 2003/0057153 A1 Mar. 27, 2003

Related U.S. Application Data

(60) Provisional application No. 60/296,540, filed on Jun. 6, 2001, provisional application No. 60/296,528, filed on Jun. 6, 2001, and provisional application No. 60/296,609, filed on Jun. 6, 2001.

(51) Int. Cl.$^7$ ................................................ C02F 3/00
(52) U.S. Cl. .................... 210/620; 210/739; 210/170; 210/746; 210/758; 210/759; 210/760; 210/761; 210/762; 210/763; 210/143; 210/150
(58) Field of Search ................ 405/128.1–128.9; 210/170, 620, 739, 746, 758–763, 143, 150

(56) References Cited

U.S. PATENT DOCUMENTS

| 5,116,515 A | * | 5/1992 | Selesnick ................ 210/744 |
| 5,286,141 A | | 2/1994 | Vigneri |
| 5,425,268 A | * | 6/1995 | Li et al. .................. 73/19.1 |
| 5,445,474 A | * | 8/1995 | Lundegard et al. ..... 405/128.45 |
| 5,611,642 A | * | 3/1997 | Wilson ................... 405/128.45 |
| 5,628,364 A | * | 5/1997 | Trenz ..................... 166/53 |
| 5,690,173 A | * | 11/1997 | Abdul et al. ............. 166/268 |
| 5,697,437 A | * | 12/1997 | Weidner et al. .......... 166/52 |
| 5,855,775 A | * | 1/1999 | Kerfoot .................. 210/170 |
| 5,874,001 A | * | 2/1999 | Carter .................... 210/610 |
| 5,885,203 A | | 3/1999 | Pelletier |
| 5,904,851 A | * | 5/1999 | Taylor et al. ............ 210/620 |
| 6,100,382 A | | 8/2000 | Wolfe et al. |
| 6,109,358 A | * | 8/2000 | McPhee et al. .......... 166/401 |
| 6,155,276 A | | 12/2000 | Oglesby et al. |
| 6,207,073 B1 | | 3/2001 | Wolfe et al. |
| 6,254,785 B1 | | 7/2001 | Phifer et al. |
| 6,262,002 B1 | | 7/2001 | Carey |
| 6,319,882 B1 | | 11/2001 | Ivey |
| 6,503,395 B1 | * | 1/2003 | Salanitro et al. .......... 210/610 |
| 6,517,288 B2 | * | 2/2003 | Schindler ................ 405/128.5 |

OTHER PUBLICATIONS

US Trademark Reg. No. 1601914 for GEOPROBE brand machine for driving sampling tubes into soil.*

* cited by examiner

Primary Examiner—Chester T. Barry
(74) Attorney, Agent, or Firm—Artz & Artz, P.C.

(57) ABSTRACT

A bioremediation method and system for destroying or reducing the level of contaminants in a contaminated subterranean body of water includes a plurality of spaced injection sites. The injection sites extend below ground and intersect a body of groundwater. Each of the plurality of injection sites are in communication with a supply of concentrated oxygen. The oxygen is conveyed by a delivery mechanism from the supply of oxygen to the injection points to naturally reduce the contaminants in the groundwater. The amount of oxygen delivered to the groundwater is maintained such that the amount of oxygen in the soil gas vapor is between 15% and 25%.

17 Claims, 2 Drawing Sheets

DIRECT OXYGEN INJECTION GROUNDWATER REMEDIATION METHOD AND SYSTEM

CROSS-REFERENCE TO RELATED APPLICATIONS

The present invention claims priority from U.S. Provisional Application No. 60/296,540, entitled "Direct Oxygen Injection Technology Systems", filed Jun. 6, 2001, U.S. Provisional Application Ser. No. 60/296,528, entitled "Enhanced Dissolved Oxygen Technology Systems", filed Jun. 6, 2001, and U.S. Provisional Application No. 60/296,609, entitled "Multi-Arrayed Vacuum Recovery Systems", filed Jun. 6, 2001.

TECHNICAL FIELD

The present invention relates generally to a method and system for reducing the level of contaminants in a body of groundwater and more particularly to a bioremediation method and system for groundwater treatment.

BACKGROUND ART

Groundwater contamination, typically arising from petroleum storage tank spills or from intentional or accidental discharge of liquid hydrocarbons or compositions containing same, has become a problem of increasing concern. This type of contamination occurs not only at industrial complexes, but also in suburban neighborhoods, which would appear to be havens from such phenomena. The source of contamination in suburban neighborhoods or areas is very commonly automobile service station sites at which antiquated or abandoned storage tanks have released gasoline, fuel oils, lubricants, and the like into the local groundwater. Other common sources of such noxious materials can include dry cleaning establishments and/or manufacturers or distributors of the tetrachloroethane which is used in the dry cleaning process.

Various remediation techniques have been utilized in the past for the treatment of contaminated groundwater in order to reduce or eliminate the contaminants, such as COCs. One of the most widely used systems is one based on so-called "pump and treat" technology. These systems withdraw the contaminated groundwater and a phase-separated product from a recovery well located in the groundwater and pump it to an above-ground treatment facility. Thereafter, various treatment techniques, as are well known, are used to remove contaminants from the displaced groundwater. These "pump and treat" systems are relatively expensive to install and require that the remaining contaminants, which have been separated from the groundwater, be disposed of in an environmentally friendly manner. These processes further increase the cost of the techniques.

One example of a known remediation system is disclosed in U.S. Pat. No. 5,286,141. The '141 patent teaches oxidizing the source of groundwater contamination to harmless constituents by locating a plurality of mutually spaced wells into a groundwater region. A treating flow of hydrogen peroxide solution is provided into the groundwater from one or more wells. The treating flow typically contains reaction surface enhancing reagents, which provide increased surfaces at which the reaction between the hydrogen peroxide and the hydrocarbon contaminants may occur. Further, a catalytic agent is also preferably incorporated into the treating solution or as a pre-injection into the groundwater region to promote the desired reaction between the hydrogen peroxide and hydrocarbons.

Recently, there has also been increasing interest in bioremediation technology. However, its use in treating groundwater has been relatively ineffective due to the complexity of the procedures and equipment required, including expensive and complex reactors. Moreover, current bioremediation techniques can cause adverse geochemical reactions and can introduce new toxic compounds into the groundwater. Additionally, current bioremediation systems, still require the use of non-organic catalysts or additives to cause the process to be completed in a reasonable period of time. These catalysts or additives raise other contaminant issues with respect to the groundwater.

It is known that naturally growing bacteria in the groundwater can break down groundwater contaminants. However, these bacteria are not always present in large enough quantities to be effective and can also be absent altogether. Moreover, these bacteria feed off oxygen and the lack of oxygen is the single biggest limiting factor on the growth of the bacterial population and therefore contaminant decrease. Ambient air, which is comprised of about 21% percent oxygen, only results in approximately 10–12 ppm of dissolved oxygen in the groundwater and thus is not sufficient to adequately destroy or reduce contaminants. Various attempts to increase the amount of oxygen by utilizing oxygen releasing compounds have been tried, but these oxygen releasing compounds, such as magnesium peroxide or calcium peroxide are expensive. Further, these oxygen releasing compounds only produce a small amount of usable oxygen and therefore do not significantly increase the bacterial population.

SUMMARY OF THE INVENTION

It is therefore an object of the present invention to provide a bioremediation method and system for groundwater treatment that is more effective than prior bioremediation systems.

It is another object of the present invention to provide a bioremediation method and system for groundwater treatment that is less expensive than prior bioremediation systems.

It is still another object of the present invention to provide a bioremediation method and system for groundwater treatment that treats contamination naturally and effectively.

It is still another object of the present invention to provide a bioremediation system that is relatively easy and inexpensive to install and operate.

It is a related object of the present invention to provide a bioremediation system that can be installed with minimal site disturbance or disruptance.

In accordance with the above and other objects of the present invention a bioremediation method and system is provided. The method includes providing a plurality of injection points extending from above ground to a subterranean body of groundwater. Substantially pure oxygen is delivered to the plurality of injection points and into the subterranean body of groundwater until the level of contaminants in the groundwater is reduced or eliminated. The amount of oxygen in the soil gas vapor is monitored and the amount of oxygen in the soil gas vapor is maintained between approximately 15% and 25%.

The system includes a plurality of injection points extending below ground such that they intersect a body of groundwater. The plurality of injection points are in communication with a supply of concentrated oxygen. The concentrated oxygen is conveyed to each of the plurality of injection points and into the groundwater. The system includes at least one monitoring well for evaluating the level of contaminants in the groundwater. The amount of oxygen in the soil gas vapor is maintained between approximately 15% and 25% to efficiently reduce contaminants in the groundwater.

The above objects and other objects, features and advantages of the present invention will be apparent from the following detailed description of best made for carrying out the invention to be taken in connection with the accompanying drawings and appended claims.

DETAILED DESCRIPTION OF THE PREFERRED EMBODIMENT

Figure 1:
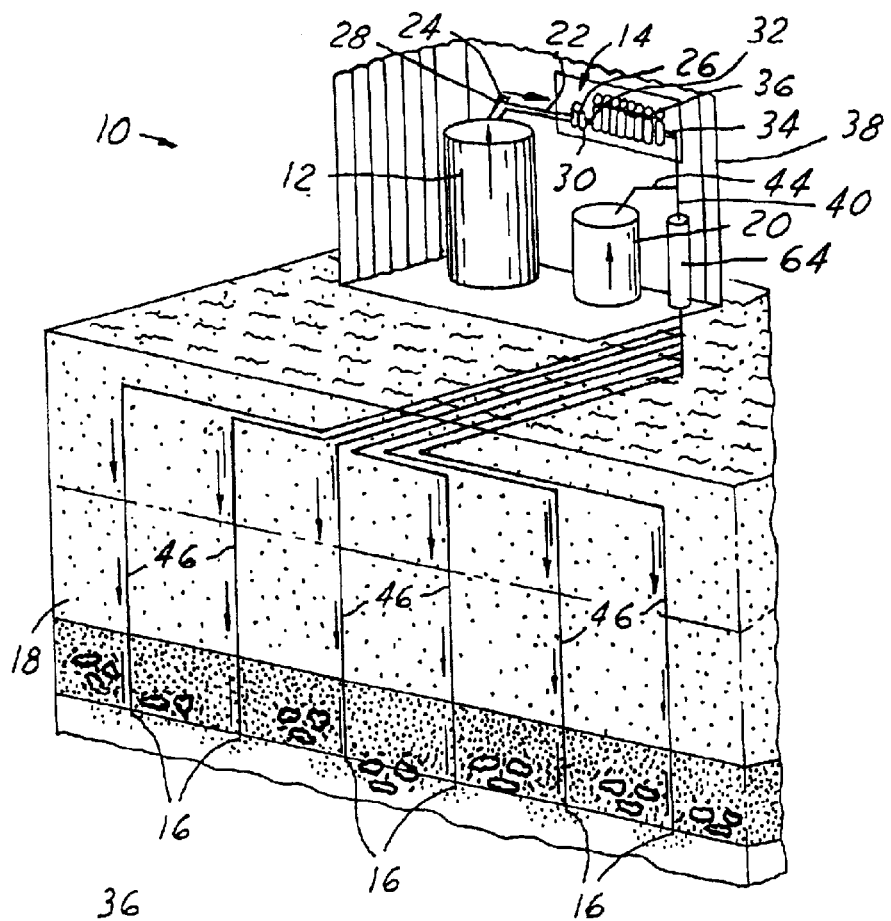
FIG. 1 is a schematic illustration of a direct oxygen injection bioremediation system in accordance with a preferred embodiment of the present invention.

Referring now to FIG. 1 which illustrates a bioremediation system 10 in accordance with the present invention. The preferred bioremediation system 10 is preferably used to clean up biodegradable petroleum constituents that are present in contaminated groundwater. However, it should be understood, that the system 10 can be used to clean up other contaminates or constituents in groundwater and that the system may be used for a variety of other purposes. For example, the system 10 may also be used to assist in cleaning up contaminants that may be present in ground soil.

The preferred bioremediation system 10 preferably includes a source of oxygen 12, such as a liquid oxygen tank. However, the oxygen can be provided in a variety of other forms. While the source of oxygen is preferably pure, it need only be of sufficient purity to accomplish the objectives of the present invention. For example, a source of oxygen that has less than 100% and over 50% oxygen may also be sufficient. The source of oxygen 12 is preferably in communication with a control panel 14 to regulate the flow of oxygen, in vapor form, from the oxygen source 12. The oxygen that flows to the control panel 14 is then conveyed to a plurality of injection sites 16 in a subterranean body of groundwater, generally indicated by reference number 18. Each of the injection sites 16 can also be placed in communication with a source of microbials to enhance clean-up. The location of the injection sites 16 can be determined in a variety of ways, as discussed below.

The source of oxygen 12 is preferably coupled to the control panel 14 by a pressure hose 20 in order to convey the oxygen in vapor form thereto. The pressure hose 20 has a first end 22 that is connected to the source of oxygen 12 and a second end 24 that is connected to the control panel 14. The source of oxygen 12 has a shut off valve 26 associated therewith, which is located between the source of oxygen 12 and the first end 22 of the pressure hose 20. The shut off valve 26 allows the flow of oxygen from the source of oxygen 12 to the pressure hose 20 to be manually closed as desired. It should be understood that the valve can also be electronically controlled to regulate the flow of oxygen from the source of oxygen 12.

The second end 24 of the pressure hose 20 is preferably connected to a pressure regulator 28 which allows the pressure of oxygen exiting the source of oxygen 12 to be controlled. In the preferred embodiment, the pressure regulator 28 is set such that the pressure of oxygen exiting the oxygen source 12 is set for example, at 100 psi. It should be understood that the pressure regulator 28 can be adjusted to regulate the flow of oxygen to a variety of different pressures.

The oxygen that exits the pressure regulator 28 enters a first conduit 30, which conveys the pressure regulated oxygen to an oxygen header pipe 32. The oxygen header pipe 32 has a plurality of flow meters 34 connected thereto and which are in fluid communication therewith to receive the pressure regulated oxygen vapor. The pressure regulator 28, the first conduit 30, the oxygen header pipe 32 and the plurality of flow meters 34 are all preferably disposed within the control panel 14. The control panel 14 is preferably mounted to a fence, wall or other structure 35. However, more or less items may be included in the control panel 14 and the control panel 14 can be located in a variety of other suitable locations.

The flow meters 34 (shown best in FIG. 3) regulate the flow of oxygen from the header pipe 32 to a respective outlet conduit 36. Each of the outlet conduits 36 is in communication with a respective one of a plurality of injection conduits 38. While FIG. 1 only shows a single outlet conduit 36, it will be appreciated that each injection conduit 28 is directly connected to a separate outlet conduit 36. Each of the injection conduits 46 terminates at a respective one of the plurality of injection sites or points 16. Each of the injection sites preferably includes a screen attached at the end of each of the injection conduits 36. Alternatively, the oxygen can be delivered into the groundwater through holes or slots formed in the end or sides of the conduits.

Accordingly, the number of flow meters 34 that are utilized in a particular system will depend upon the number of injection sites 16 that are determined to be necessary to clean up the groundwater at a given location. Similarly, the number of outlet conduits 36 and the number of injection conduits 38 will depend upon the number of injection sites 16 that are determined to be necessary to clean up a body of groundwater. Thus, each injection site 16 has an injection conduit 38, an outlet conduit 36, and a flow meter 34 associated therewith to regulate the flow of oxygen to that injection site 16. The conduits, pipes, tubes, and injection points are preferably constructed of PVC piping. The outlet conduits 36 are preferably ¼–⅜ inch tubing and the injection conduits 30 are preferably ½ inch tubing. The size and material of the pipes and conduits can obviously vary.

As discussed above, in the preferred embodiment, a plurality of injection conduits 38 are utilized to convey the pure oxygen from the source of oxygen 12 to the injection sites 16. While the source of oxygen 12 is preferably initially in liquid form, the pressure in the source 12 causes the liquid to turn to vapor. It is the pure oxygen vapor that is captured and then delivered through the delivery system and reacts with the microbials. The injection points 16 and the injection conduits 38 can be installed by any of a variety of methods, including by typical hollow stem auger with sand backfill. This is primarily for sites interbedded with clays and the like. Alternatively, the injection conduits 38 may be installed by known GeoProbe® (GeoProbe is a registered trademark of KEJR Engineering, Inc. of Kansas) installation techniques.

In accordance with the above-described system, the injection conduits 38 are preferably installed by airjet injection.

Airjet injection is a novel installation technique that is part of the present invention. In accordance with the present invention, airjet injection utilizes a compressor that is connected to an injection conduit 38 via a hose or the like. The air flow and pressure from the compressor act as a cutting tool allowing the injection conduit 38 to be "injected" or inserted into the ground with minimal site description and with minimal time and capital expense. It has been determined that up to eighty (80) or more injection points can be installed in a single day. This is significantly higher than the number of points that could be installed under prior installation methods.

Figure 2:
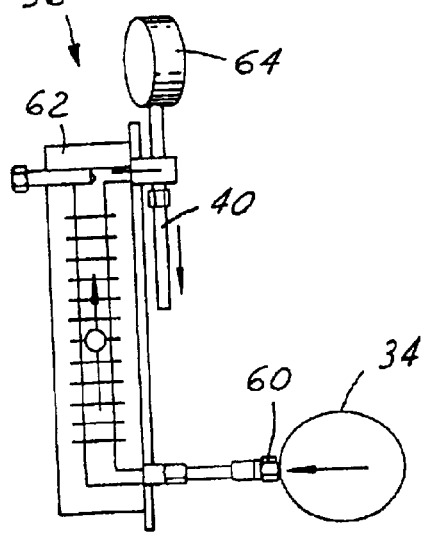
FIG. 2 is an illustration of a preferred flow meter for use with the system in accordance with the present invention.

As shown in more detail in FIG. 2, each flow meter 34 is preferably connected to the oxygen header pipe 32 by a compression fitting 40 that allows oxygen at the regulated pressure to be delivered thereto. Each flow meter 32 is preferably mounted to a mounting board 42 or other structure in the control panel 14 and includes a pressure indicator 44 that provides a visual indication of the pressure of fluid, such as oxygen, flowing therethrough. The outlet conduits 36 that are in communication with the outlet of the flow meters 34 preferably extend through a protective conduit 46 (FIG. 1), which extends from the control panel 14 into the ground. The protective conduit 46 acts to shield and protect the outlet conduits 36 from damage. The outlet conduits 36 are preferably located at least one foot below the ground and run generally parallel thereto. The injection conduits 38 are in communication with a respective one of the outlet conduits 36 and extend generally perpendicularly downward from the respective outlet conduit 36 and into communication with the groundwater. As shown, the injection conduits 38 intersect the groundwater 18 below the water table at designated injection sites 16 in order to deliver the pure oxygen, and, if desired, microbials thereto.

Figure 3:
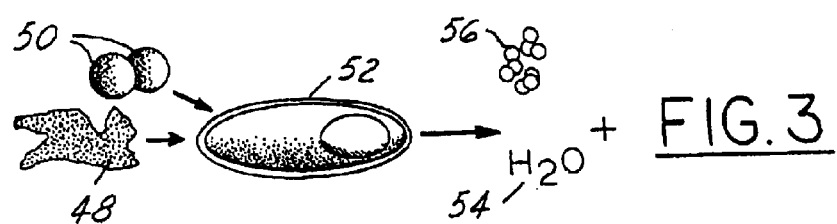
FIG. 3 is a schematic illustration of the breakdown of contaminants in accordance with the present invention.

Referring now to FIG. 3, which illustrates the desired chemical reaction induced in the groundwater by the preferred bioremediation system 10. As shown, when a body of groundwater needs remediation, contaminants are present in the groundwater 18, as generally indicated by reference number 48. Oxygen molecules, as generally indicated by reference number 50, are fed to a microbial, which is generally indicated by reference number 52. The microbial 52 feeds off the oxygen molecules 50 and breaks down the contaminants 48 into a combination of water, as generally indicated by reference number 54 and carbon dioxide, as generally indicated by reference number 56. It will be understood that the contaminants are typically a COC chain, but could be a variety of other contaminants that require removal.

Given that the above-described reaction can take a long time to remediate contaminants from groundwater naturally, it has been determined as part of the present invention, that pure or substantially pure oxygen works to clean up contaminants in a body of groundwater quicker and more efficiently than ambient air. Moreover, pure or substantially pure oxygen works to clean up contaminants more efficiently and at less cost than various oxygen releasing compounds. By increasing the amount of dissolved oxygen, it has been found that the bacterial population increases by over a magnitude of a thousand. One issue thus becomes how to deliver the pure oxygen into the ground and into communication with the groundwater. In accordance with the present invention, the preferred way is through the delivery system described above. Moreover, other delivery systems for conveying the oxygen to the injection sites may also be utilized.

Figure 4:
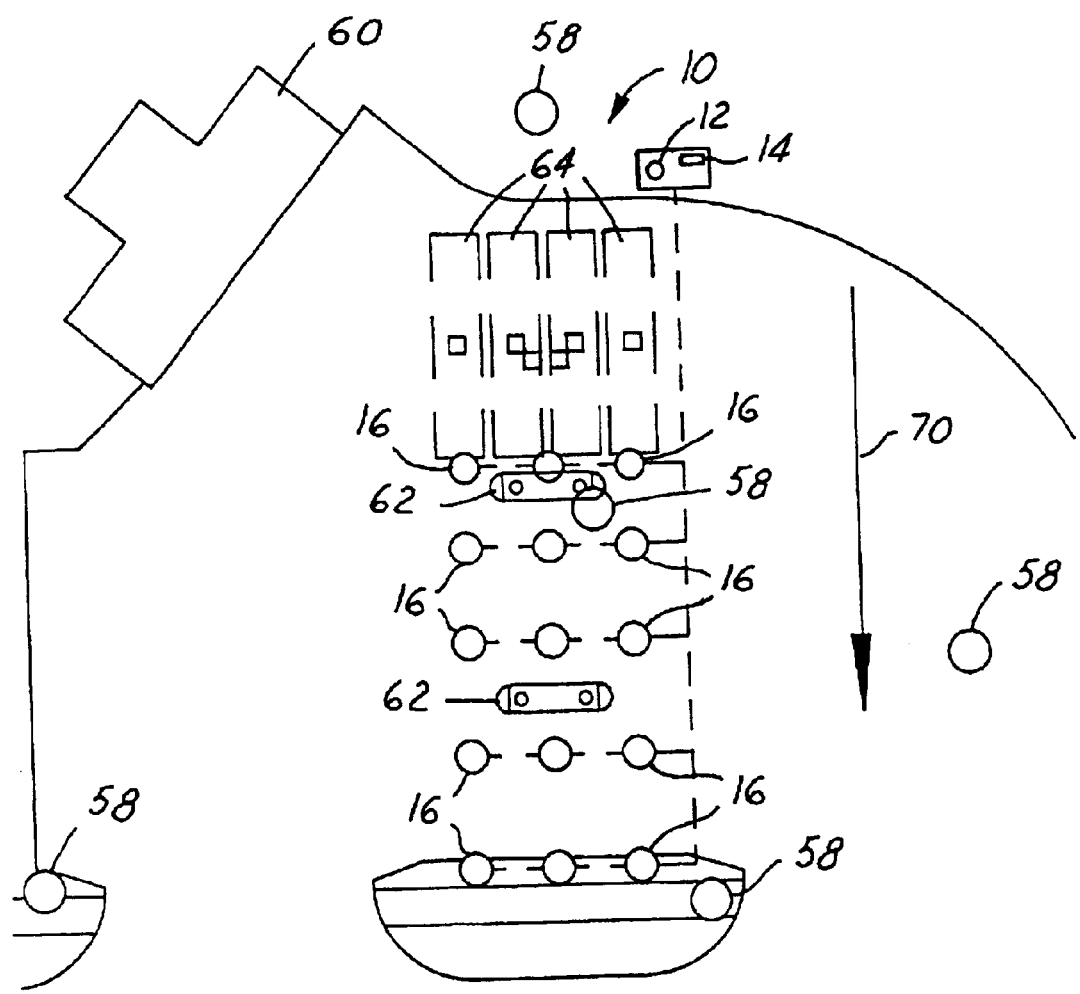
FIG. 4 is a schematic illustration of an exemplary direct oxygen injection bioremediation system installation in accordance with a preferred embodiment of the present invention.

The system 10 is preferably installed at a site that was formerly a service station (as shown in FIG. 4) that has been determined to have groundwater, which is contaminated with petroleum, whether through accidental or intentional spillage. As is known, the groundwater can be tested through the use of a monitoring well to determine whether or not the groundwater has been contaminated. In accordance with the present invention, one way for determining the existence of contaminants is the absence or depletion of oxygen, which indicates that naturally existing bacteria are feeding on the oxygen in an effort to breakdown the contaminants.

When evaluating a site for feasibility of the disclosed system, it is best to start by looking at soil gas in the vadose zone just above the groundwater interface. Specifically, the concentrations of carbon dioxide and oxygen should be examined. When the soil gas in the area of groundwater contamination is examined, elevated levels of carbon dioxide and depleted or nearly depleted levels of oxygen are typically seen. When the soil gas outside the area of contamination is examined, it is typically found that the levels of carbon dioxide are lower than in the area of contamination and the levels of oxygen are higher than in the area of contamination. One must be careful in this comparison to assure a comparison of similar soil types and conditions. However, when this situation is identified it is reasonable to assume that the reason for the elevated level of carbon dioxide and depleted levels of oxygen within the contaminated zone is based on the presence of bacteria consuming all available oxygen and producing carbon dioxide. Because of the lack of oxygen in the contaminated area only a limited population of bacteria is possible, although all other conditions for a larger population exist. Any increase in the level of oxygen will increase the bacteria population and rate of contamination degradation. It can be assumed that a body of groundwater has unacceptable levels of contamination when the percentage of oxygen in soil gas in the vadose zone just above the groundwater interface, is less than approximately 21% oxygen and less than the oxygen levels in the vadose zone just above the groundwater interface, at nearby locations with similar soil conditions, that are known to be uncontaminated.

It can also be assumed that a body of groundwater has unacceptable levels of contamination when the percentage of carbon dioxide in soil gas in the vadose zone, just above the groundwater interface, is greater than 0.5 percent and greater than carbon dioxide levels in soil gas in the vadose zone just above the ground water interface at nearby locations with similar soil conditions that are known to be uncontaminated.

When these two situations occur simultaneously (that is, the depleted oxygen environment along the with elevated carbon dioxide environment), it is because there exists a population of bacteria consuming contamination along with available oxygen and respiring carbon dioxide. This assumption is further enhanced when at a location nearby with similar soil conditions, that is known to be uncontaminated, oxygen levels are significantly higher than at locations within the contaminated zone and carbon dioxide levels are significantly lower than at locations within the contaminated zone. One must be careful to assure comparisons of locations based proximity, similar soil types, and site conditions.

Once it has been determined that the groundwater is contaminated, in accordance with the present invention, the location of the injection points or sites can be determined. The location of the injection points can be determined in a variety of different methods. Preferably, however, the injection points are located in a grid that takes into account the direction and flow rate of groundwater flow. By taking into account the groundwater flow, as generally indicated by reference number 70, injection sites will be positioned to prevent contaminants from spreading. Typical grid determination is based on site specifics, but generally, a grid is based on a determination of two months of groundwater flow (e.g. if the groundwater flows 120 feet per year, the grid would be a 20 foot grid). A grid pattern is preferred as it helps insure proper spacing between the injection sites 16. A grid pattern is preferred as it helps insure proper spacing between the injection sites and consistent oxygen levels in the vadose zone—and in migrating groundwater Accordingly, as shown in FIG. 4, the exemplary system 10 is installed at a gas station 60 having a plurality of dispenser islands 62. The dispenser islands 62 were provided with petroleum from a plurality of storage tanks 64. A plurality of monitoring wells 58 are utilized to determine the extent and location of any contaminants so that the system usage can be maximized. In FIG. 4, five (5) monitoring wells 58 are illustrated. Obviously, any number of monitoring wells can be included. The injection sites 16 are preferably located in a grid pattern as shown (i.e. columns and rows), and then the injection conduits 38, which are connected to the source of oxygen 12 and the control panel 14 are installed to inject oxygen into the groundwater at the injection sites 16. As set forth above, the injected oxygen is preferably pure, but need only have sufficient purity to accomplish the objects of the invention are achieved.

Once the system 10 is installed, the oxygen vapor is regulated and metered to be delivered into the groundwater at a predetermined rate. The rate is preferably adjusted over time. The dissolved oxygen in the groundwater and the amount of oxygen in the soil gas vapor is monitored to assure a sufficient flow of oxygen to the injection sites 16. Similarly, the oxygen is monitored to determine if too much oxygen is being added in order to prevent undue waste of oxygen and thereby increase expense. In accordance with the present invention, it has been determined through testing that the preferred level of oxygen present in soil gas vapor is in the range of about approximately 15% to 25%. More preferably, the level of oxygen in the soil gas vapor is approximately 21%. It will be understood that the level of oxygen in the soil gas vapor can vary. For example, it can be higher than 25%, even though it is believed that levels above 25% can be inefficient. Moreover, it can also be lower than 15% depending upon the application. The level of oxygen in the soil gas vapor can be determined through soil gas monitoring and testing techniques, as are known in the art.

The level of oxygen in the soil gas can be controlled by regulating the flow of oxygen to each of the injection sites 16 through their associated flow meters 34. If not enough oxygen is injected into the groundwater, i.e., the level of oxygen in the soil gas vapor is significantly less than 15%, the remediation process will not occur any faster than it would naturally. If too much oxygen is injected into the groundwater, the remediation process will not occur any faster than it would with the preferred levels of oxygen. Obviously, the flow rate and pressure of the oxygen vapor to the injection sites 16 can be varied as needed to increase or decrease the flow rate of oxygen. The effect of the system on the contaminants can be monitored periodically through the monitoring wells. Further, if the source of oxygen 12 becomes depleted, it can be easily replaced without disrupting the clean up process.

The preferred system is relatively inexpensive to install as it costs significantly less than prior systems. Moreover, the system operates twenty-four hours a day and requires no electricity or maintenance to operate. Further, as there are no moving parts, there is nothing to lube, oil or grease. The system is also less susceptible to break down.

While particular embodiments of the invention have been shown and described, numerous variations and alternate embodiments will occur to those skilled in the art. Accordingly, it is intended that the invention be limited only in terms of the appended claims.

What is claimed is:

1. A method for remediating a contaminated region of a subterranean body of groundwater to destroy or reduce initial concentration levels of contaminants, comprising:
   providing at least one injection point extending from above ground to the subterranean body of groundwater;
   delivering oxygen to said at least one injection point and into the subterranean body of groundwater;
   monitoring soil gas vapor to determine a level of oxygen in said soil gas vapor; and
   regulating oxygen flow to said at least one injection point such that said level of oxygen in said soil gas vapor is approximately 15% or above.

2. The method of claim 1, further comprising:
   providing a plurality of injection points extending from above ground and into communication with the subterranean body of groundwater.

3. The method of claim 2, further comprising:
   providing a supply of oxygen in communication with each said plurality of injection points.

4. The method of claim 1, wherein said level of oxygen in said soil gas vapor is maintained within a range having a low end oxygen level of approximately 15% or above.

5. The method of claim 2, wherein said plurality of injection points are arranged in a grid pattern.

6. The method of claim 3, wherein said supply of oxygen is in liquid form.

7. The method of claim 6, further comprising:
   converting said liquid oxygen to oxygen vapor.

8. The method of claim 1, further comprising:
   installing said at least one injection point through GeoProbe installation techniques.

9. The method of claim 1, further comprising:
   installing said at least one injection point through airjet installation techniques.

10. The method of claim 1, wherein said delivered oxygen is substantially pure.

11. A system for remediating a contaminated subterranean body of groundwater to destroy or reduce the levels of contaminants, comprising:
    a plurality of injection points extending below ground and into communication with the body of groundwater;
    a supply of concentrated oxygen in communication with each of said plurality of injection points;
    a mechanism for delivering said concentrated oxygen to each of said plurality of injection points;
    at least one monitoring well for evaluating the level of contaminants in the groundwater; and
    a device for regulating the delivery of oxygen to each of said plurality of injection points, to maintain a level of oxygen in the soil gas vapor at about 15% or above;
    said device for regulating the delivery of oxygen to each of said plurality of injection points includes a plurality of flow meters with a respective one of said plurality of flow meters being associated with a respective one of said plurality of injection points.

12. A system for remediating a contaminated subterranean body of groundwater to destroy or reduce the levels of contaminants, comprising:

a plurality of injection points extending below ground and into communication with the body of groundwater;

a supply of concentrated oxygen in communication with each of said plurality of injection points;

a mechanism for delivering said concentrated oxygen to each of said plurality of injection points;

at least one monitoring well for evaluating the level of contaminants in the groundwater; and a device for regulating the delivery of oxygen to each of said plurality of injection points, to maintain a level of oxygen in the soil gas vapor at about 15% or above;

said mechanism includes a plurality of conduits for conveying said concentrated oxygen to said plurality of injection points.

13. A method for remediating contaminated groundwater, comprising:

providing a supply of oxygen;

removing oxygen from said supply of oxygen;

regulating the pressure of said removed oxygen;

injecting said oxygen into the groundwater such that an oxygen level in a soil gas vapor of said groundwater is at least 15%; and monitoring and maintaining said oxygen level in said soil gas vapor to be between approximately 15% and 25% during the remediation process.

14. The method of claim 13, wherein said supply of oxygen is in liquid form.

15. The method of claim 14, wherein said removed oxygen is in vapor form.

16. The method of claim 13, further comprising:

regulating the flow rate of said oxygen injected into said groundwater.

17. The method of claim 16, further comprising:

monitoring the levels of oxygen in the soil gas vapor to determine whether the flow rate of oxygen needs adjustment.

* * * * *